US007740085B2

(12) United States Patent
Roussy

(10) Patent No.: US 7,740,085 B2
(45) Date of Patent: Jun. 22, 2010

(54) VIBRATORY APPARATUS FOR A ROTARY-VIBRATORY DRILL

(76) Inventor: Raymond J. Roussy, 12491 - 57A Avenue, Surrey, British Columbia (CA) V3X 2S6

( * ) Notice: Subject to any disclaimer, the term of this patent is extended or adjusted under 35 U.S.C. 154(b) by 1225 days.

(21) Appl. No.: 11/299,689

(22) Filed: Dec. 13, 2005

(65) Prior Publication Data

US 2007/0151377 A1 Jul. 5, 2007

(51) Int. Cl.
*F16H 33/10* (2006.01)
*F16H 37/00* (2006.01)

(52) U.S. Cl. ......................... 173/49; 173/90; 173/162.1

(58) Field of Classification Search ................... 173/49, 173/90, 162.1; 74/87
See application file for complete search history.

(56) References Cited

U.S. PATENT DOCUMENTS 1,346,755 A 7/1920 Lanchester
1,902,787 A 3/1933 Duesenberg
3,248,957 A * 5/1966 Pinazza ......................... 74/61
3,446,084 A 5/1969 Bodine
3,583,497 A * 6/1971 Kussowski et al. ............ 173/49
3,656,419 A 4/1972 Boone
3,721,129 A 3/1973 Wallick
3,786,874 A * 1/1974 Jodet et al. ..................... 173/49
3,866,693 A * 2/1975 Century ....................... 173/49
4,050,527 A * 9/1977 Lebelle ........................ 173/49
4,060,138 A * 11/1977 Cox et al. ...................... 173/49
4,096,762 A 6/1978 Bodine
4,143,719 A * 3/1979 Furukawa et al. .............. 173/1
4,265,129 A 5/1981 Bodine
4,288,165 A 9/1981 Fewel et al.
4,553,443 A * 11/1985 Rossfelder et al. .......... 74/22 R
4,586,847 A 5/1986 Stanton
4,693,325 A 9/1987 Bodine
5,027,908 A 7/1991 Roussy
5,088,565 A * 2/1992 Evarts ......................... 173/49
5,409,070 A 4/1995 Roussy
5,547,056 A 8/1996 Stone et al.
5,634,515 A 6/1997 Lambert
6,112,833 A 9/2000 Lambert
6,551,020 B2 4/2003 Swanson et al.
2003/0221870 A1 12/2003 Johnson

FOREIGN PATENT DOCUMENTS

GB 477188 5/1936
GB 911589 11/1962
GB 1047224 10/1966
GB 1187326 4/1970
GB 1274020 5/1972
GB 1489136 10/1977
GB 2155589 9/1985
WO WO 99/02891 1/1999

* cited by examiner

*Primary Examiner*—Brian D Nash
(74) *Attorney, Agent, or Firm*—Cameron IP

(57) ABSTRACT

A vibratory apparatus comprises an eccentric mass disposed within a housing. A shaft and bushing are received by the eccentric mass and couple the eccentric mass to a crankshaft. An internal conduit extends longitudinally within the shaft. Input and output conduits each communicate with the internal conduit to allow a lubricant to flow through the shaft. A bore extends radially through the bushing. Lubricant flowing through the shaft may further flow through the bore and form a lubricating layer between the bushing and the eccentric mass.

9 Claims, 5 Drawing Sheets

VIBRATORY APPARATUS FOR A ROTARY-VIBRATORY DRILL

BACKGROUND OF THE INVENTION

This invention relates to orbiting mass vibrators, and in particular, to orbiting mass vibrators adapted for use on a rotary-vibratory drills or sonic drills.

In conventional orbiting mass vibrators adapted for use on rotary-vibratory drills, vibratory energy is generated by a pair of counter-rotating eccentric masses rotating along confined orbital paths within a housing. The eccentric masses are confined to the orbital paths by a cylindrical bore in the housing. Each eccentric mass is coupled to the housing and delivers vibratory forces to the housing. The housing in turn provides the vibratory output to a drill bit. However, if the eccentric masses and crankshafts are not properly aligned, excess vibratory forces may develop in the crankshafts. These excess vibratory forces may ultimately cause damage to the rotary-vibratory apparatus. It is therefore an objective of the invention to provide a self compensating mechanism which allows the eccentric masses and crankshafts to remain decoupled during the operation of the rotary-vibratory apparatus.

SUMMARY OF THE INVENTION

According to one aspect of the invention there is provided a vibratory apparatus. The vibratory apparatus is comprised of a housing, an eccentric mass, a crankshaft, a first member, a second member and an operating mechanism for rotating the crankshaft. The crankshaft is rotatably mounted within the housing and the crankshaft is operatively connected with the eccentric mass. The first member is hollow and open at both ends. The first member also has an inner space and outer surface. The first member is received by the eccentric mass. The second member is received within the inner space of the first member and extends axially from the first member. The second member is connected with the crankshaft and the first member is allowed radial movement about the second member along a first axis.

According to another aspect of the invention, there is provided in combination a rotary drive apparatus, a drill string, and a vibratory apparatus. The vibratory apparatus is comprised of a housing, an eccentric mass, a crankshaft, a first member, a second member and an operating mechanism for rotating the crankshaft. The crankshaft is rotatably mounted within the housing and the crankshaft is operatively connected with the eccentric mass. The first member is hollow and open at both ends. The first member also has an inner space and outer surface. The first member is received by the eccentric mass. The second member is received within the inner space of the first member. The second member is connected with the crankshaft and the first member is allowed radial movement about the second member along a first axis. A liquid forms a lubricating layer between the first member and the eccentric mass.

This invention provides the advantage of allowing the eccentric mass and crankshaft of the vibratory apparatus to remain decoupled. Therefore despite imperfect machining of the components, machine wear or excess play of the crankshaft, the incidents of malfunction of the vibratory apparatus and damage to the vibratory apparatus are reduced.

BRIEF DESCRIPTION OF THE DRAWINGS

In drawings which illustrate embodiments of the invention.

DESCRIPTION OF THE PREFERRED EMBODIMENTS

Figure 1:
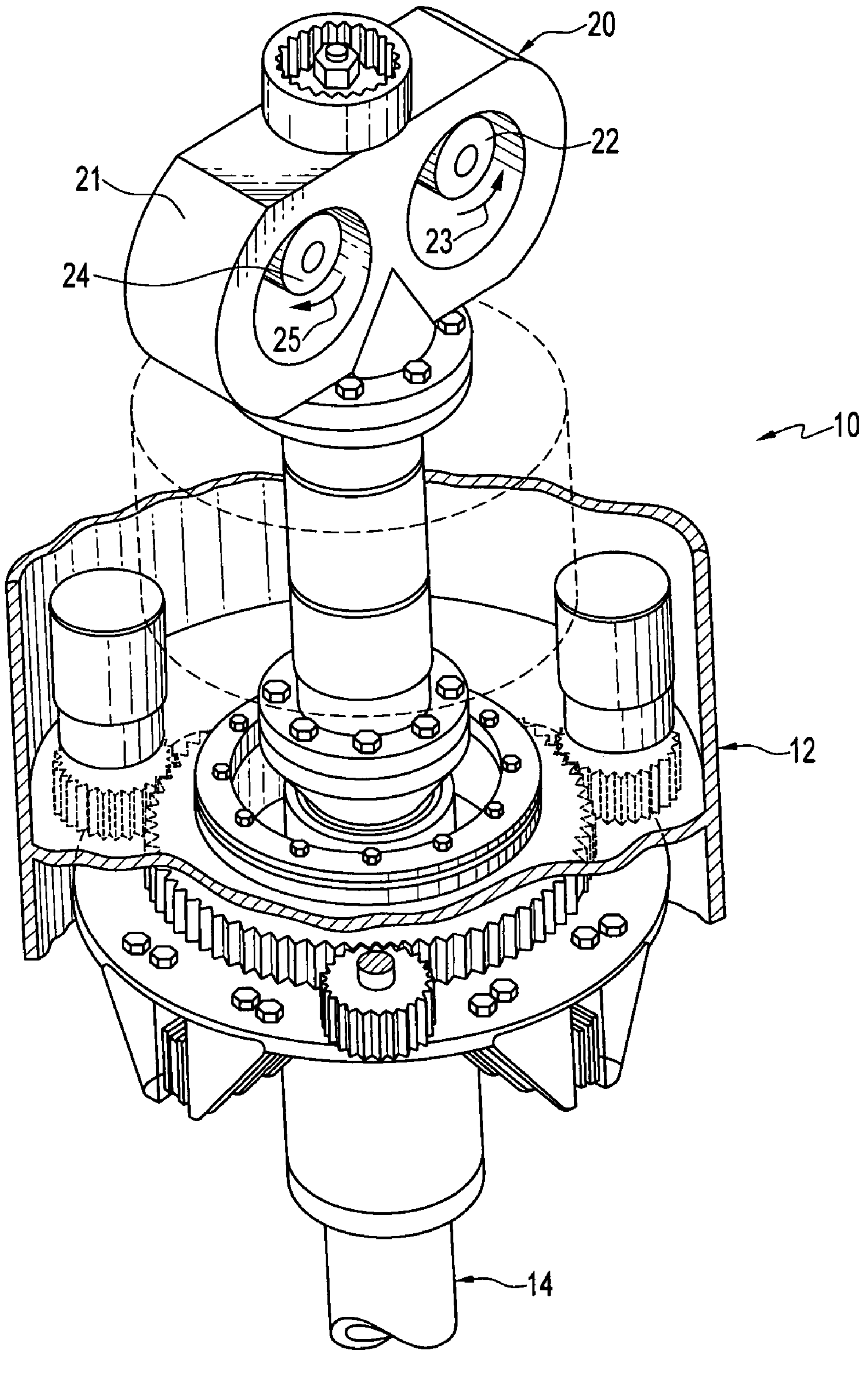
FIG. 1 is a fragmentary, partly broken away, isometric view of a rotary-vibratory drill with a vibratory apparatus, according to an embodiment of the invention.

Referring to the drawings and first to FIG. 1, this shows this shows a rotary-vibratory drill 10 which is generally similar to a type already known in the art and disclosed in my earlier patents, namely U.S. Pat. No. 5,027,908 and U.S. Pat. No. 5,409,070, which are incorporated herein by reference.

The drill 10 is comprised of a vibratory apparatus 20, a rotary drive apparatus 12, and a drill string 14. The drill string 14 is shown in fragment in FIG. 1. The vibratory apparatus 20 includes a pair of counter rotating eccentric masses 22 and 24 within a housing 21. Eccentric mass 22 rotates in the direction indicated by arrow 23 and eccentric mass 24 rotates in the direction indicated by arrow 25. The eccentric masses 22 and 24 are positioned relative to their axes of rotation such that they coincide at the tops and bottoms of their strokes, but are on opposite sides when midway between the tops and bottoms of their strokes. As a result, the vibrations imparted to the drill 10 by the eccentric masses 22 and 24 are additive in the vertical direction and subtractive in the horizontal direction, the net vibrating forces being in the vertical direction.

Figure 2:
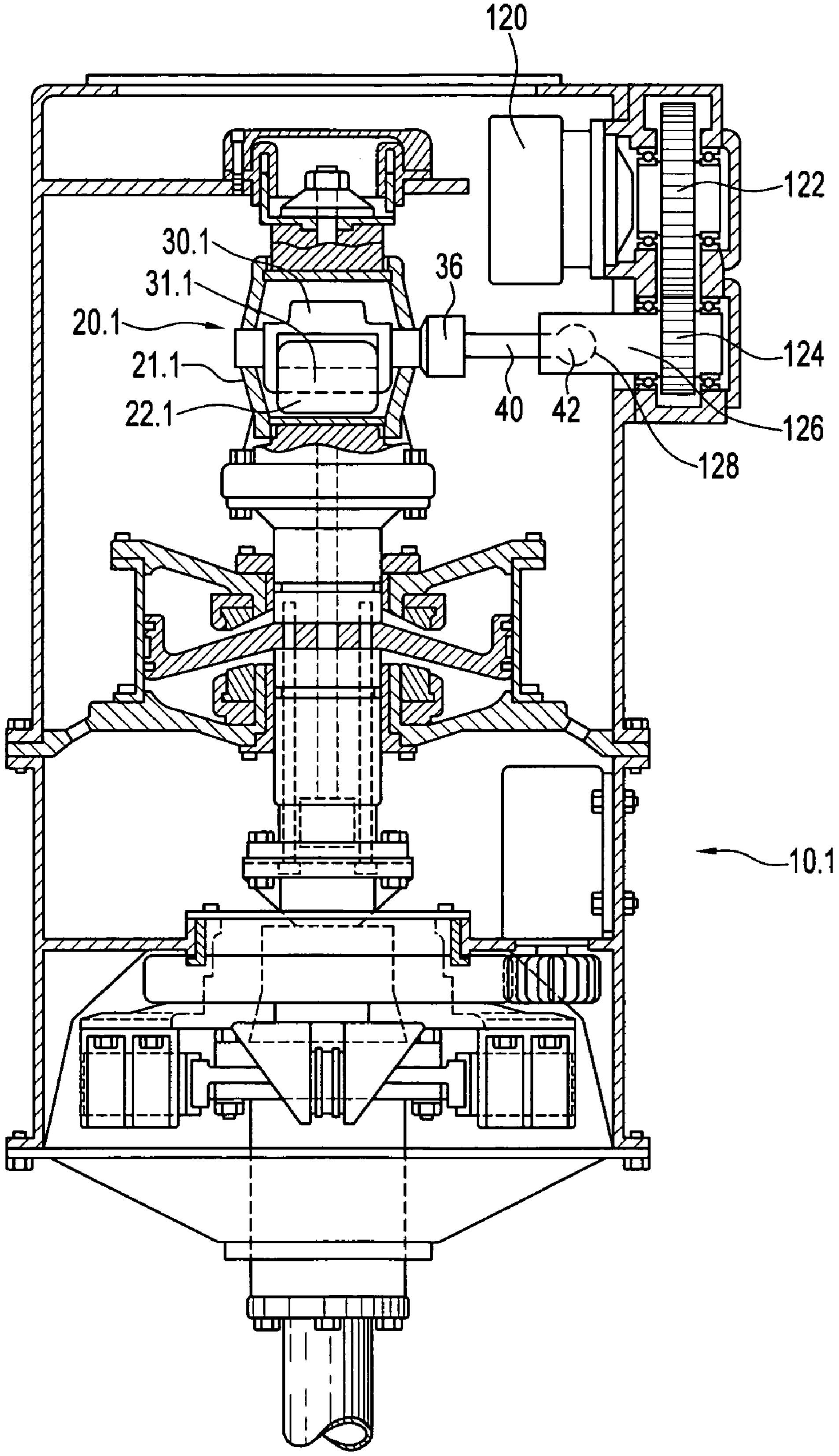
FIG. 2 is an elevational, partly broken away view of another rotary-vibratory drill with a vibratory apparatus, according to an embodiment of the invention.

The eccentric masses are rotated on crankshafts, such as a crankshaft 30.1 shown in FIG. 2 for eccentric mass 22.1. Parts in FIG. 2 have like numbers to those in FIG. 1 with the additional numerical designation "1". The crankshaft 30.1 is mounted at both ends within the housing 21.1 of the vibratory apparatus 20.1. There is a splined socket 36 at the one end of the crankshaft 30.1. The eccentric mass 22.1 is mounted on a crankpin 31.1. The crankshaft 30.1 is rotated by a hydraulic motor 120 coupled to a first shaft 126 by gears 122 and 124. A second shaft 40 operatively connects the crankshaft 30.1 to the first shaft 126. The first shaft 126 has a splined socket 128. The second shaft 40 has a first splined ball 42 which is received by the splined socket 128 on the first shaft 126. The second shaft 40 has a second splined ball (not shown), similar to ball 42, which is received by the splined socket 36 of the crankshaft 30.1. The splined balls and sockets allow for vertical movement of the second shaft 40 as the vibratory apparatus vibrates.

In a preferred embodiment of the invention, each eccentric mass is part of its own eccentric system. The eccentric systems are generally equivalent notwithstanding the direction in which the eccentric mass rotates. Therefore, although the following disclosure is limited to a single eccentric system in a preferred embodiment of the invention, it is also applicable to the complementary counter-rotating eccentric system.

Figure 3:
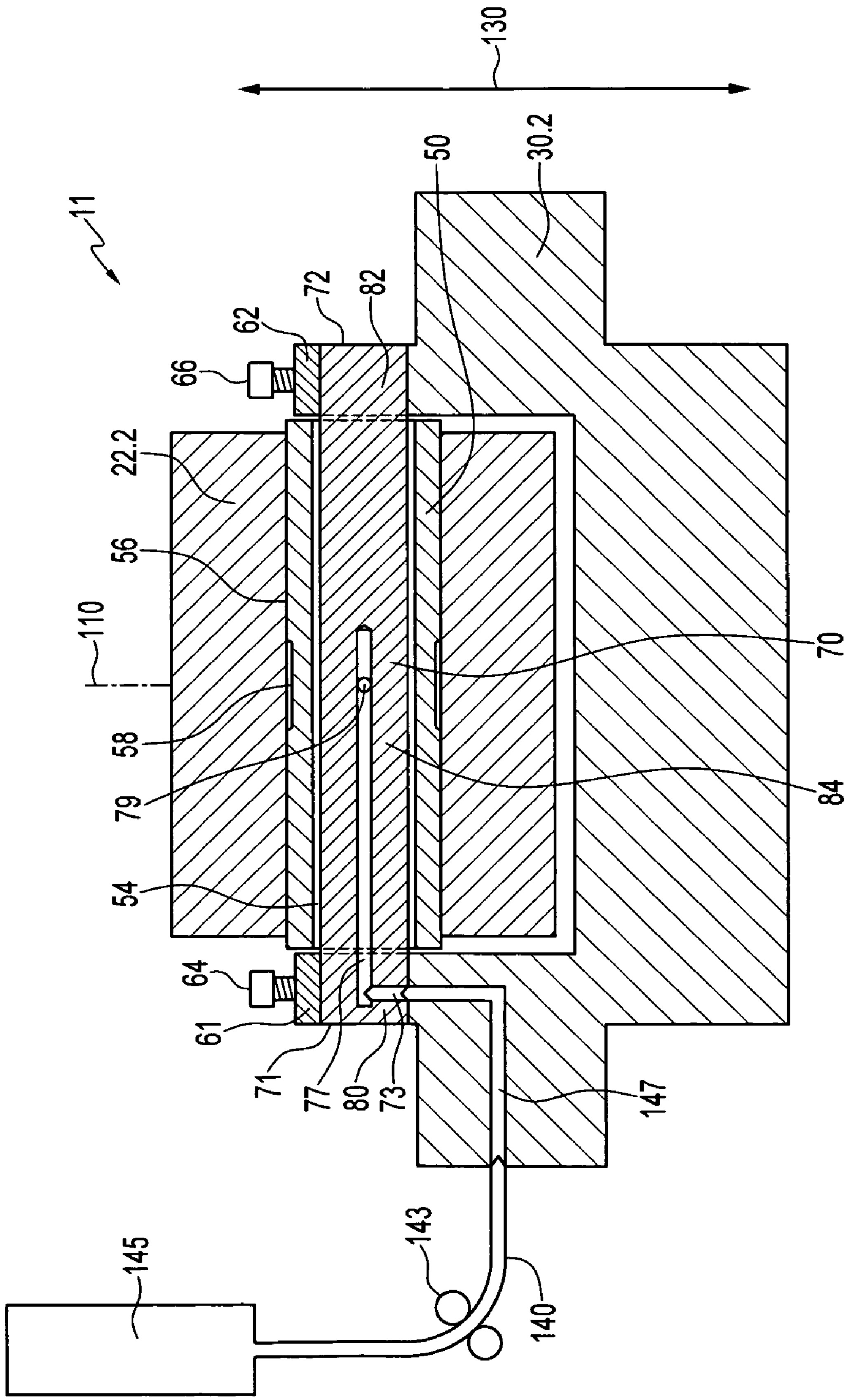
FIG. 3 is an elevational, cross-sectional view of an eccentric system of a vibratory apparatus, according to an embodiment of the invention.
Figure 6:
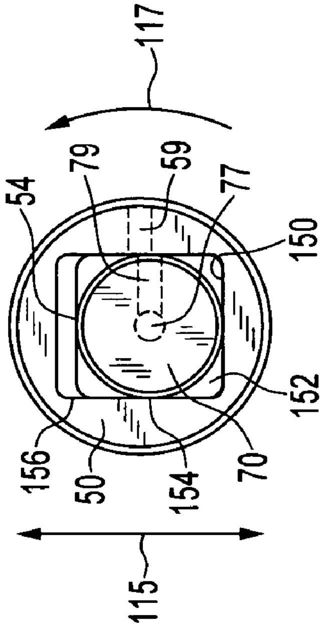
FIG. 6 is a elevation end view illustrating the first member received by the second member.

An eccentric system 11 of a preferred embodiment of the invention is best shown in FIG. 3. The eccentric mass 22.2 is a roller having a longitudinal bore extending therethrough. A first member 50 is received within the bore of the eccentric mass 22.2. The first member 50 is a hollow elongated member which is open at both ends. In this embodiment of the invention the first member 50 is a bushing. A second member 70 is received within an inner space 54 of the first member 50 as seen in FIGS. 3 and 6. In this embodiment of the invention, the second member 70 is a shaft having a first end 71 and a second end 72. The first end 71 and second end 72 of the second member 70 extend axially and outwardly from the first member 50 and the eccentric mass 22.2. As seen in FIG. 3, the second member 70 is secured to a crankshaft 30.2 and brackets 61 and 62 by bolts 64 and 66. Additional bolts are typically used as well but are not shown.

Rotation of the crankshaft 30.2 causes the eccentric mass 22.2 to rotate along an orbital path, thereby imparting vibratory forces to housing 21.1, shown in FIG. 2, which in turn provides the vibratory output to a drill bit.

Figure 4B:
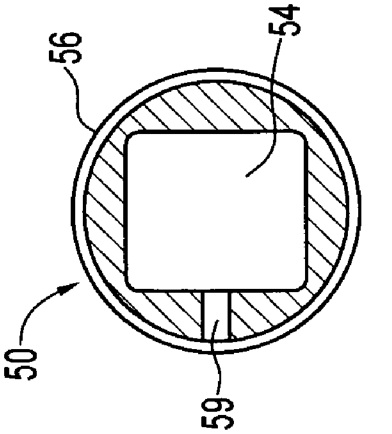
FIG. 4B is an elevational end view thereof.
Figure 4A:
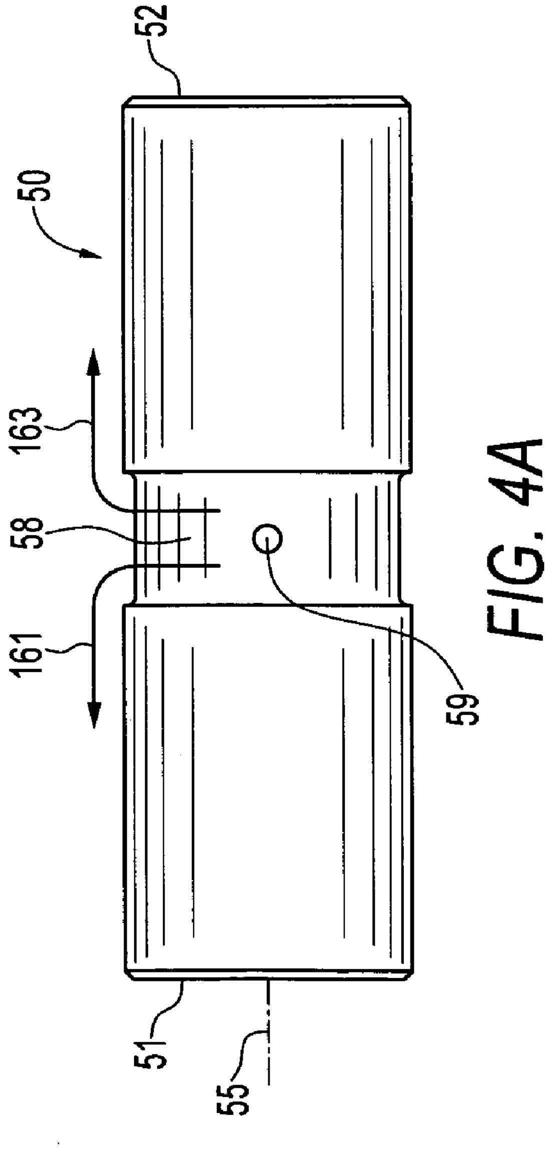
FIG. 4A is an elevational side view of the first member of the eccentric system illustrated in FIG. 3.

The first member 50, according to the preferred embodiment of the invention, is shown in better detail in FIGS. 4A and 4B. The first member 50 is a hollow elongated member having an open first end 51 and an open second end 52. The inner space 54 extends the entire length of the first member and is rectangular in section, in this example. An outer surface 56 of the first member 50 is generally rounded and smooth. There is an annular recess 58 on the outer surface 54 of the first member 50 approximately midway between the first end 51 and the second end 52. The recess 58 extends about a circumference of the outer surface 56. There is a bore 59 located within the recess 58. The bore 59 extends through the first member 50 from the outer surface 56 to the inner space 54 in a direction generally perpendicular to a longitudinal axis 55 of the first member.

Figure 5B:
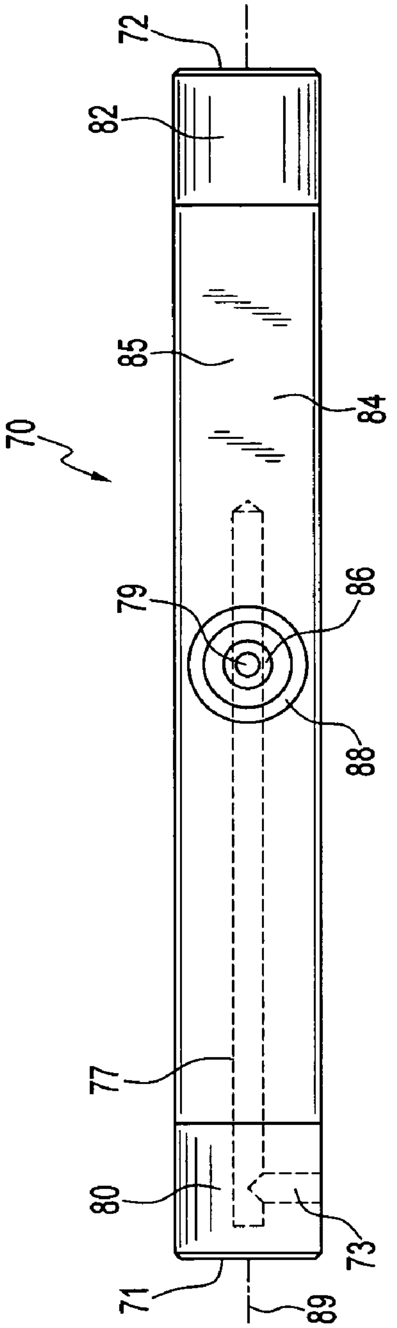
FIG. 5B is an elevational side view thereof.
Figure 5A:
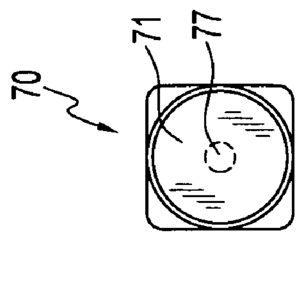
FIG. 5A is an elevational end view of the second member of the eccentric system illustrated in FIG. 3.

The second member 70, according to the preferred embodiment of the invention, is shown in better detail in FIGS. 5A and 5B. The second member 70 is an elongated member comprised of a rectangular prism portion 84 flanked by a first cylindrical portion 80 at the first end 71 and a second cylindrical portion 82 at the second end 72. There is an internal conduit 77 extending within the second member 70. The internal conduit 77 is generally parallel to a longitudinal axis 89 of the second member 70, as best shown in FIGS. 3 and 5B.

Referring now specifically to FIG. 5B, there is an input conduit 73. The input conduit 73 extends into the second member 70 and communicates with internal conduit 77, thereby allowing a liquid to flow into the internal conduit. In this example, the input conduit 73 extends into the first cylindrical portion 82 of the second member and is generally perpendicular to the longitudinal axis 89 of the second member 70.

There is a circular indentation 86 located on a first side 85 of the rectangular prism portion 84 of the second member 70. The first circular indentation 86 is approximately midway between the first end 71 and the second end 72 of the second member 70. There is a ring shaped indentation 88 circumambient to, and concentric with, the circular indentation 86. An output conduit 79 communicates with the internal conduit 77 and extends from the internal conduit to the circular indentation 86, thereby allowing a liquid to be discharged from the internal conduit 77 to an outside environment. The output conduit 79 is concentric with the first circular indentation 86 and is generally perpendicular to the longitudinal axis 89 of the second member 70.

The preferred embodiment of the invention, the eccentric system 11 is used to impart a vibratory output to a drill bit of a rotary-vibratory drill, or sonic drill. The eccentric system 11 operates as follows:

The second member 70 is received within the inner space 54 of the first member 50, as shown in FIGS. 3 and 6. The rectangular prism portion 84 of the second member 70 is encompassed by the first member 50. The cylindrical portions 80 and 82 of the second member 70 extend axially and outwardly from the first member 50. As best shown in FIG. 6, a first extent or side 150 of the rectangular prism portion 84 of the second member 70 is generally equal to a first extent or side 152 of the inner space 54 of the first member 50. A second extent or side 154 of the rectangular prism portion of the second member 70 is relatively shorter than a second extend or side 156 of the inner space 54 of the first member 50. The second extents 154 and 156 are generally perpendicular to their corresponding first extents 150 and 152. This arrangement allows radial movement of the first member 50 relative to the second member 70 in the direction generally indicated by arrows 115. Movement of the first member relative to the second member in other directions is restricted. When the eccentric system is operational, the combination of the first member 50 and second member 70 are rotated by a crankshaft in the direction generally indicated by arrow 117.

Referring back to FIG. 3, brackets 61 and 62, held in place by bolts 64 and 66, clamp the first and second cylindrical portions 80 and 82 of the second member 70 to the crankshaft 30.2. The second member 70 is therefore coupled to the crankshaft 30.2. The first member 50 is allowed similar radial movement, relative the second member 70, and is therefore similarly decoupled from the crankshaft 30.2. The eccentric mass 22.2 is also allowed radial movement, relative the second member 70, and is similarly decoupled from the crankshaft 30.2. The first member 50 and eccentric mass 22.2 are allowed movement along a first axis 110 in a direction indicated generally by arrows 130. The first axis 110 is generally perpendicular to the longitudinal axis 89 of the second member 70.

Rotation of the crankshaft 30.2 causes the eccentric mass 22.2 to rotate along an orbital path. The rotating eccentric mass 22.2 imparts vibratory forces to a housing, such as housing 21.1 shown in FIG. 2. The housing in turn provides the vibratory output to a drill bit (not shown). In known rotary-vibratory drills, or sonic drills, imperfections in the tolerances between adjacent parts may cause stress on a crankshaft when the crankshaft is rotating an eccentric mass. However, in eccentric system 11 the eccentric mass 22.2 and the crankshaft 30.2 are decoupled. As such, the eccentric mass 22.2 and the crankshaft 30.2 are able to self-align and compensate for any imperfections in tolerances. The eccentric mass 22.2 can therefore be rotated within a housing, such as housing 21.1 shown in FIG. 2, without stressing the crankshaft 30.2. The net result being that only the eccentric mass 22.2 transmits radial forces to the housing.

An additional feature of the preferred embodiment of the invention is that a liquid may be introduced to the eccentric system 11. As best shown in FIG. 3, the liquid is pumped by a pump 143 from a reservoir 145, along a supply conduit 140, to the crankshaft 30.2. The supply conduit 140 is in communication with a first end of a crankshaft conduit 147. The crankshaft conduit 147 extends through the crankshaft 30.2. A second end of the crankshaft conduit 147 is in communication with the input conduit 73 of the second member 70. The liquid flows through the crankshaft 30.2 along the crankshaft conduit 147 and into the second member 70. The liquid flows through the second member 70 and is discharged through the output conduit 79 of the second member and through the radially extending bore 59 of the first member 50. The liquid flows over the outer surface 56 of the first member 50, as indicated generally by arrows 161 and 163 in FIG. 4A, acting as lubricant between the first member 50 and the eccentric mass 22.2. In this embodiment of the invention the liquid is an oil.

It will be understood by someone skilled in the art that many of the details provided here are by way of example only and can be varied or deleted without departing from the scope of the of the invention as set out in the following claims.

I claim:

1. A vibratory apparatus, the apparatus comprising:

a housing;

an eccentric mass disposed within the housing;

a crankshaft rotatably mounted within the housing and operatively coupled to the eccentric mass;

a bushing received by the eccentric mass, the bushing having an outer surface and an inner space;

a bore extending radially through the bushing, the bore being generally perpendicular to a longitudinal axis of the bushing;

a shaft received within the inner space of the bushing and extending axially from the bushing, the shaft being connected to the crankshaft and the bushing being allowed radially movement about the shaft;

an internal conduit extending longitudinally within the shaft, an input and output conduit each communicating with the internal conduit to allow a liquid to flow through the shaft; and an operating mechanism for rotating the crankshaft.

2. The apparatus as claimed in claim 1, wherein the operating mechanism for rotating the crankshaft is a motor coupled to the crankshaft by gears, the operating mechanism being able to rotate the crankshaft so as to generate sonic vibratory forces.

3. The apparatus as claimed in claim 1, further including a liquid reservoir and a supply conduit operatively connecting the liquid reservoir with the input conduit of the shaft, liquid flowing from the liquid reservoir along the supply conduit, liquid being discharged from the supply conduit into the input conduit of the shaft, liquid being discharged from input conduit of the shaft into the internal conduit of the shaft, liquid being discharged from the internal conduit of the shaft into the output conduit of the shaft, liquid being discharged from the output conduit of the shaft into the inner space of the bushing, and liquid being discharged through the bore of the bushing such that liquid flows around the outer surface of the bushing.

4. The apparatus as claimed in claim 3, wherein the liquid forms a lubricating layer between the outer surface of the bushing and the eccentric mass.

5. The apparatus as claimed in claim 4, wherein the liquid is oil.

6. The apparatus as claimed in claim 1, wherein the inner space of the bushing is rectangular in cross-section and the shaft has a rectangular prism portion, the rectangular prism portion of the shaft being received within the inner space of the bushing, a first extent of the rectangular prism portion of the shaft being generally equal to a first extent of the inner space of the bushing, and a second extent of the rectangular prism portion of the shaft being relatively shorter than a second extent of the inner space of the bushing.

7. The apparatus as claimed in claim 1, wherein the shaft is integral with the crankshaft.

8. The apparatus as claimed in claim 1, wherein the eccentric mass is a roller.

9. The vibratory apparatus as claimed in claim 1 in combination with a rotary drive apparatus and a drill string.

* * * * *